Nov. 20, 1934.   G. E. NERNEY   1,981,706
EYEGLASS CONSTRUCTION
Filed Oct. 30, 1930
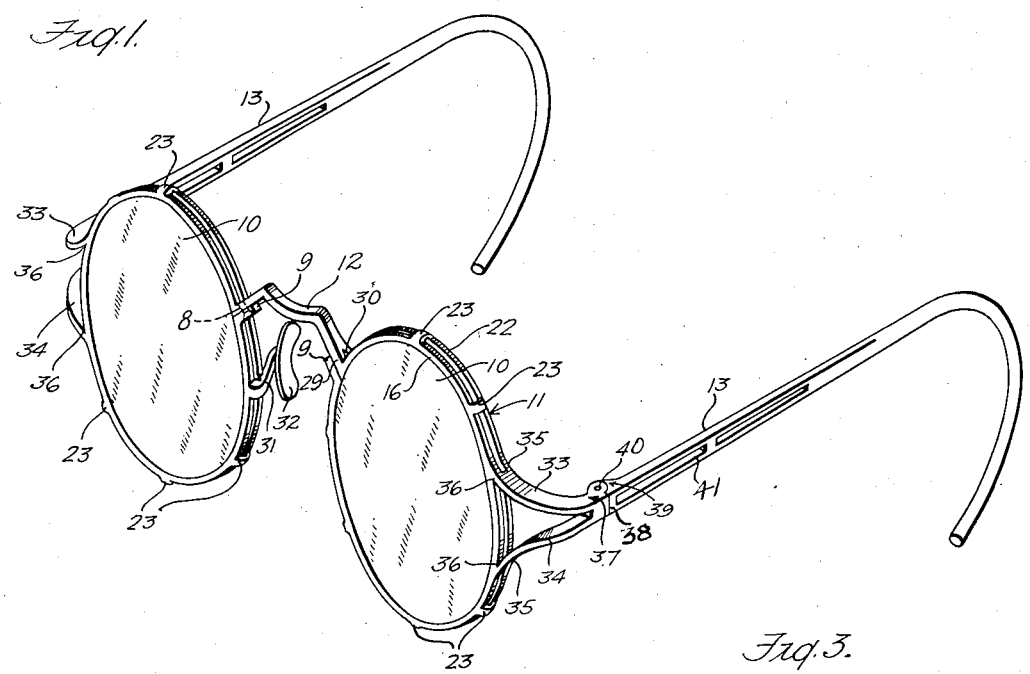
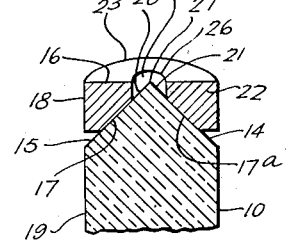
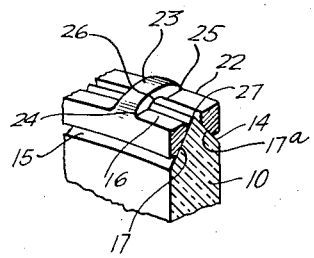
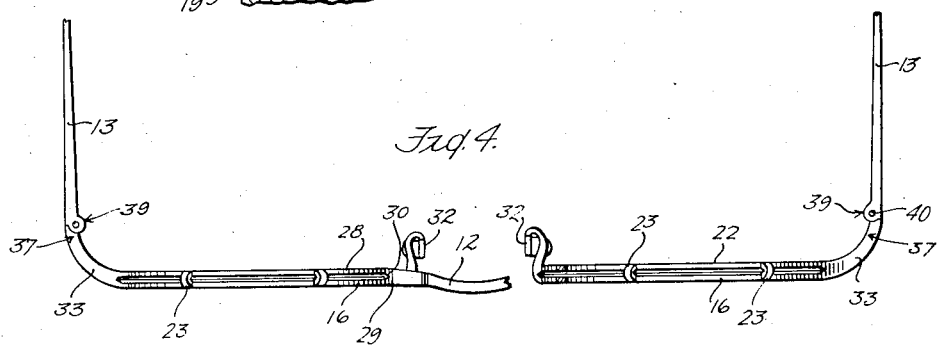
INVENTOR
BY George E. Nerney
Janney Blair & Curtis ATTORNEYS Patented Nov. 20, 1934

1,981,706

UNITED STATES PATENT OFFICE 1,981,706

EYEGLASS CONSTRUCTION

George E. Nerney, Attleboro, Mass., assignor to Bay State Optical Company, Attleboro, Mass., a corporation of Maine Application October 30, 1930, Serial No. 492,188

10 Claims. (Cl. 88—47)

This invention relates to eyeglass construction, and with regard to its more specific features, to construction of the rims and temples of eyeglass frames:

One of the objects of this invention is to provide an eyeglass frame of simple construction and pleasing design. Another object is to provide a device of the above character which shall be strong and at the same time light. Another object is to provide a device of the above character in which the hazard of chipping the lenses is reduced to a minimum. Another object is to provide a device of the above character which shall be of easy and economical manufacture. Another object is to provide a device of the above character which will readily withstand the usual wear and tear of use. Other objects will be in part obvious and in part pointed out hereinafter.

This invention accordingly consists in the features of construction, combination of elements, and arrangement of parts as will be exemplified in the structure to be hereinafter described, and the scope of the application of which will be indicated in the following claims.

In the accompanying drawing in which is shown one of the various possible embodiments of this invention, Fig. 1 is a perspective view of the entire frame, Fig. 2 is a cross section through the rim construction and the lens, Fig. 3 is a perspective of one portion of the lens and rim partially in cross section, and Fig. 4 is a top plan view of the parts shown in Fig. 1.

Similar references and characters refer to similar parts throughout the several views of the drawings.

As conducive to a ready understanding of some of the important features of this invention, it may be noted that, generally speaking, a saving of metal in the frames of eyeglasses is of greater value not only on account of the high cost of material, but by reason of lighter weight and a more attractive appearance. Furthermore, in conventional eyeglass construction, in order to make the rims light, it is common to make the lens groove so shallow that the lens is prone to snap out upon the slightest jar to the frames or in the event of pressure being applied at the temples or bridge. Furthermore, this common form of rim construction rests snug against the edge of the lens so that a jar on the rim as from dropping will be transmitted to the rim directly with consequent danger of breakage. This invention aims to provide a simple and thoroughly practical construction for overcoming the above-mentioned difficulties.

Referring now to the drawing in detail there are shown eyeglasses of the frame type comprising lenses 10, rims generally indicated at 11, bridge 12 and temples 13. As the construction on both sides of the eyeglasses is the same, that upon one side only will be described.

The periphery of the lens 10, as more clearly shown in Fig. 2, is beveled to form the opposite edges 14 and 15. Lying flush against the edge 15 of this lens is the metallic member 16. The under surface 17 of this member 16, or that surface in engagement with the edge 15 of the lens 10 is beveled at an angle corresponding to that of the edge 15. By this construction the edge 18 of the metallic member 16 will lie substantially in a plane with the edge of the lens 10. Furthermore, it will be noted that the under surface 17 of this metallic member 16 does not extend along the entire length of the beveled edge 15, thus leaving a small portion 20 of the lens 10 free and out of engagement with any metallic member.

Resting on the opposite edge 14 of the lens 10 is a metallic member 22 of similar construction to the metallic member 16 described above, and a portion 21 of this edge 14 is out of engagement with this metallic member similar to the portion 20 of the edge 15. It will be seen that by this construction a rim consisting of two separate and independent elements 16 and 22 has been provided.

Connecting these two members 16 and 22 is a bridge-like member 23 secured to the upper surfaces thereof at points 24 and 25 respectively, as shown more clearly in Fig. 3. The number and position of these bridge-like members 23 about the periphery of the two metallic members 16 and 22 is not arbitrary, and they may be spaced in any way found most desirable. Thus if an octagonal lens was employed instead of a round one as disclosed in the drawing it might be convenient to employ one of these bridge-like members at each corner. The under surface 26 of this bridge-like member 23 is disposed substantially above the highest point 27 of the lens 10. It will be understood from this explanation that a small space 28 is provided between the upper portions of the surfaces 14 and 15 of the lens 10, the highest point 27 of the lens 10 and the under surface 26 of the bridge-like member 23, so that this highest point 27 or periphery of the lens 10 which is most sensitive to shocks and jars, is free from contact with any metallic member.

If the eyeglasses are dropped or receive a shock in any other manner, the force of the blow will be transmitted to the central portions of the beveled edges 14 and 15 which are well adapted to withstand possible breakage under all common circumstances.

By this simple design of thoroughly practical construction, a compact rim for lenses has been provided in which a minimum amount of metal has been employed. This device, while being extremely economical in manufacture, performs the functions of a rim in an efficient manner, and greatly reduces the total weight of the frame. Besides having a pleasing appearance this compound rim performs a difficult mechanical function in safeguarding to a large degree against breakage.

The bridge 12 is secured to the members 16 and 22 of the rim generally indicated at 11 at points 29 and 30 respectively, and below this bridge, extending across the surface of the rim and secured thereto is a metallic member 31. This metallic member 31 extends to the rear toward the nose of the wearer to support a nose engaging member 32.

The ends of the members 16 and 22 lie flush against the bridge connecting points 29 and 30 respectively. Secured to these members adjacent connecting points 29 and 30 is a lug 8, one surface of which substantially engages the under surface of the bridge 12. Extending through this lug 8 and countersunk therein is a screw 9 threaded into bridge 12. Upon removing the screw 9 rim-like members 16 and 22 may be spread to insert lens 10 in the frame and upon reinserting and tightening this screw these members will engage lens 10 in the manner described above.

It will be understood that the construction of this bridge 12 and nose engaging member 32 is outlined here merely for purposes of an adequate disclosure, and that the particular construction shown herein should not be construed in a limiting sense, as any design or construction might be employed for this purpose. Furthermore, it should be understood that any references herein to the word "edges" signifies the beveled edges formed on the outer periphery of the lenses 10; any reference to a surface signifies the under surfaces 17 and 17a of the metallic members 16 and 22 respectively; and any reference to the word "rearward" means in a direction substantially toward the face of the wearer.

Considering now the construction on the outer end of the lens, there are shown two metallic members 33 and 34 secured to both portions 16 and 22 of the rim at points 35 and 36. These members converge toward each other and extend rearwardly to meet integrally to form a temple connecting member generally indicated at 37. At the rear of this member 37 is a stop 38, and adjacent the stop the members 33 and 34 extend rearwardly to form a slotted eye generally indicated at 39. Thus I have provided temple connecting means which because of its skeleton construction combines the advantages of being light and at the same time thoroughly durable.

It will be noted that the members 33 and 34 may be integral portions of the metallic members 16 and 22. However, this is not an essential feature of this construction and these members may be separate units secured to the rims by any desired means such as welds. Secured to the eye 39 by a screw or rivet 40 and in substantial registry with the opposite sides thereof is the temple 13. This temple may be of any desired shape extending to the rear to engage the head of the wearer. Extending along the longitudinal axis of this temple 13 are the slots 41, protruding through the entire width thereof. For convenience and symmetry of appearance the length of these slots may correspond to the distance between the bridges 23 on the rims generally indicated at 11, thus presenting a more pleasing appearance while not affecting the mechanical features of my invention. These slots decrease materially the weight of the frame as well as provide a means for substantial saving in metal.

The construction of these frames is particularly adapted to hard use where the eyeglasses may be subjected to various strains and jars. It should be particularly noted that in case the eyeglasses are dropped and land on the rims, as they would under normal circumstances, the first portion of the frames to hit the receiving surface would be the tops of the bridge-like member 23. These bridges are so designed as to fend off the force of such a blow and spread it to those portions of the lenses which are more suited to withstand a shock. By providing the space 28 so that the under edge of the bridge 26 is out of engagement with sensitive point 27 of the lens, no portion of a shock, such as that mentioned above, would be transported to this part of the lenses. While providing these obvious mechanical advantages in an extremely strong construction, this eyeglass construction will be very light as all metal unnecessary in providing a durable construction has been excluded therefrom. Furthermore, the space 28 running around the entire periphery of the lens affords access for extra light which is very pleasing to the wearer.

As a further advantage of a thoroughly practical nature it will be seen that upon tightening the screw 9 after inserting the lens no pressure will be brought to bear on the periphery 27, as no portion of the rims is in engagement therewith. As this periphery is a delicate portion of lens 10 a great deal of pressure may be applied through screw 9 without the hazard of breaking the lens. Thus an eyeglass frame has been provided which will be very strong, light and afford considerable saving in manufacture.

As many possible embodiments may be made of the above invention, and as many changes may be made in the embodiment above set forth, it is to be understood that all matter hereinbefore set forth or shown in the accompanying drawing is to be interpreted as illustrative and not in a limiting sense.

I claim:

1. In eyeglass construction, in combination, a lens having an edge comprising two oblique surfaces diverging from a peripheral point thereon, a pair of parts completely encircling said lens and each engaging one of said surfaces of said edge and spaced from each other, a plurality of members connecting said spaced parts and spaced from the edge of said lens, a temple, and means secured to said parts at more than one point and converging to form connecting means for said temple.

2. In eyeglass construction, in combination, a lens having an edge comprising two oblique surfaces diverging from a peripheral point thereon, a pair of parts each engaging one of said surfaces of said edge and spaced from each other, bridge members looped over and out of contact with said peripheral point connecting said spaced parts and spaced from said peripheral point, a temple, and means secured to said parts at more than one point and converging to form connecting means for said temple.

3. In eyeglass construction, in combination, a lens, a pair of spaced members engaging the edge of said lens to form a rim therefor, a series of parts connecting said members and spaced from said edge, and a pair of parts each connected to each of said members at spaced points and converging to a common point to form a temple connecting device.

4. In eyeglass construction, in combination, a lens whose edge comprises two surfaces diverging from its peripheral point, a pair of rim members each engaging one of said surfaces and spaced from said peripheral point in a direction laterally away from said point, each rim member completely encircling and contacting its respective lens-edge surface, a plurality of bridge members connecting said rim members and looped over and out of contact with and spaced from said peripheral point, and temple means comprising a plurality of members diverging from the axis of said temple and connected to both of said rim members.

5. In eyeglass construction, in combination, a lens whose edge comprises two oblique surfaces diverging from its peripheral point, a pair of rim members having oblique surfaces each in engagement with one of said first-mentioned oblique surfaces and spaced from said peripheral point, and parts connected to each of said rim members and extending across said peripheral point, said parts being spaced from said peripheral point, said rim members and any one of said parts being in cross-section shaped like an inverted U whose respective arms, corresponding respectively to said rim members, contact with and engage said oblique surfaces respectively and whose cross-piece corresponding to said parts bridges over and is out of contact with said peripheral point of said lens.

6. In eyeglass construction, in combination, a lens whose edge includes two surfaces diverging from its peripheral point, a pair of rim members each having an oblique surface in engagement with one of said diverging surfaces, the tops of said rim members being substantially in a cylindrical zone passing through said peripheral point, and a series of bridge parts extending across and spaced from said peripheral point, said bridge parts each being connected to both of said rim members.

7. In eyeglass construction, in combination, a lens having a pair of beveled edges diverging away from its peripheral point, a pair of rim parts each engaging one of said beveled edges and being spaced from said peripheral point, and a plurality of elements secured to said rim parts bridging said peripheral point and spaced therefrom whereby pressure applied to any of said elements is distributed on said beveled edges and excluded from said peripheral point.

8. In eyeglass construction, in combination, a lens having a pair of beveled surfaces diverging away from a peripheral point thereon, a pair of rim parts each having a beveled surface in engagement with said first-mentioned beveled surfaces, and a plurality of elements connecting said rim parts and spaced from each other, said elements being out of engagement with said peripheral point and spaced therefrom whereby pressure applied to said elements is distributed along said first-mentioned beveled surfaces and excluded from said peripheral point.

9. In eyeglass construction, in combination, a lens whose edge comprises two surfaces diverging from its peripheral point, a pair of rim members each engaging one of said surfaces and spaced from said peripheral point, bridge members connecting said rim members spaced from and extending over and out of contact with said peripheral point, said rim members being split, and means for drawing the ends of said rim members together whereby each rim member grips and extends about one of said diverging surfaces while said bridging members remain out of contact with said peripheral point.

10. In eyeglass construction, in combination, a lens whose edge comprises two surfaces diverging from its peripheral point, a rim part having an oblique surface in engagement with one of said edge surfaces, a rim part having an oblique surface in engagement with the other of said edge surfaces, the outer peripheral surfaces of both of said parts being in substantially the same cylindrical zone, and a series of members each connected to both of said parts and spaced from said peripheral point, said last-mentioned members adapted to protect the peripheral point of said lens from damage.

GEORGE E. NERNEY.